US011528203B2

(12) United States Patent
Sevcik

(10) Patent No.: US 11,528,203 B2
(45) Date of Patent: Dec. 13, 2022

(54) PACKET SWITCH WITH HARDWARE INTERVAL COUNTERS AND ASSOCIATED COMPUTER TO GENERATE NETWORK TRAFFIC ACTIVITY DATA

(71) Applicant: Cpacket Networks Inc., San Jose, CA (US)

(72) Inventor: Peter John Sevcik, San Jose, CA (US)

(73) Assignee: Cpacket Networks Inc., San Jose, CA (US)

( * ) Notice: Subject to any disclaimer, the term of this patent is extended or adjusted under 35 U.S.C. 154(b) by 0 days.

(21) Appl. No.: 16/993,961

(22) Filed: Aug. 14, 2020

(65) Prior Publication Data
US 2022/0052934 A1   Feb. 17, 2022

(51) Int. Cl.
*H04L 43/067* (2022.01)
*H04L 43/0894* (2022.01)
*H04L 43/12* (2022.01)

(52) U.S. Cl.
CPC ........ *H04L 43/067* (2013.01); *H04L 43/0894* (2013.01); *H04L 43/12* (2013.01)

(58) Field of Classification Search
CPC ... H04L 43/067; H04L 43/0894; H04L 43/12; H04L 43/16; H04L 45/50
USPC ........................................................ 709/224
See application file for complete search history.

(56) References Cited

U.S. PATENT DOCUMENTS

| 5,179,557 | A  | * | 1/1993  | Kudo ..................... H04L 49/103 370/232 |
| 2004/0203834 | A1 | * | 10/2004 | Mahany ................. H04B 1/707 455/451 |
| 2008/0049757 | A1 | * | 2/2008  | Bugenhagen ........... H04L 43/00 370/395.1 |
| 2008/0049777 | A1 | * | 2/2008  | Morrill ................. H04L 67/141 370/420 |
| 2008/0052394 | A1 | * | 2/2008  | Bugenhagen ........... H04L 45/22 709/224 |
| 2010/0017640 | A1 | * | 1/2010  | Gallant .................... G06F 1/14 713/502 |
| 2011/0289578 | A1 | * | 11/2011 | Bugenhagen ........ H04Q 3/0062 726/11 |
| 2012/0287809 | A1 | * | 11/2012 | Bockwoldt ......... H04L 43/0876 370/252 |

(Continued)

OTHER PUBLICATIONS

International Search Report and Written Opinion of the International Searching Authority dated Sep. 9, 2021, for PCT Application No. PCT/US2021/045416, filed on Aug. 10, 2021, 9 pages.

*Primary Examiner* — Anh Nguyen
*Assistant Examiner* — Tony Williams
(74) *Attorney, Agent, or Firm* — Cooley LLP

(57) ABSTRACT

A system has a packet switch for routing network traffic. The packet switch includes a system counter to increment a counter time in predetermined time segments, time stamping logic to associate a received packet with the counter time, and an interval discriminator to assign a received packet to a selected interval counter of a set of interval counters based upon the counter time. A computer is connected to the packet switch. The computer has a memory with instructions executed by a processor to associate the counter time with a time of day, and collect values from the set of interval counters to generate network traffic activity data.

8 Claims, 4 Drawing Sheets

(56) References Cited

U.S. PATENT DOCUMENTS

2013/0343408 A1\* 12/2013 Cook ................. H04L 67/10
                                                          370/474
2016/0370769 A1\* 12/2016 Matsue .............. G01S 19/27
2017/0257647 A1\* 9/2017 Iguchi ............... H04N 21/234

\* cited by examiner

US 11,528,203 B2

PACKET SWITCH WITH HARDWARE INTERVAL COUNTERS AND ASSOCIATED COMPUTER TO GENERATE NETWORK TRAFFIC ACTIVITY DATA

FIELD OF THE INVENTION

This invention relates generally to computer networks. More particularly, this invention relates to evaluating computer network traffic activity using hardware interval counters and an associated computer running software to generate network traffic activity data.

BACKGROUND OF THE INVENTION

Commercial devices that evaluate computer network traffic are known. It is common for such devices to perform data compression and data analyses in hardware in real-time. This arrangement adds significant cost to the system. These devices commonly have many ports and therefore each port requires special hardware.

Accordingly, there is a need for a more cost effective way to evaluate computer network traffic.

SUMMARY OF THE INVENTION

A system has a packet switch for routing network traffic. The packet switch includes a system counter to increment a counter time in predetermined time segments, time stamping logic to associate a received packet with the counter time, and an interval discriminator to assign a received packet to a selected interval counter of a set of interval counters based upon the counter time. A computer is connected to the packet switch. The computer has a memory with instructions executed by a processor to associate the counter time with a time of day, and collect values from the set of interval counters to generate network traffic activity data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
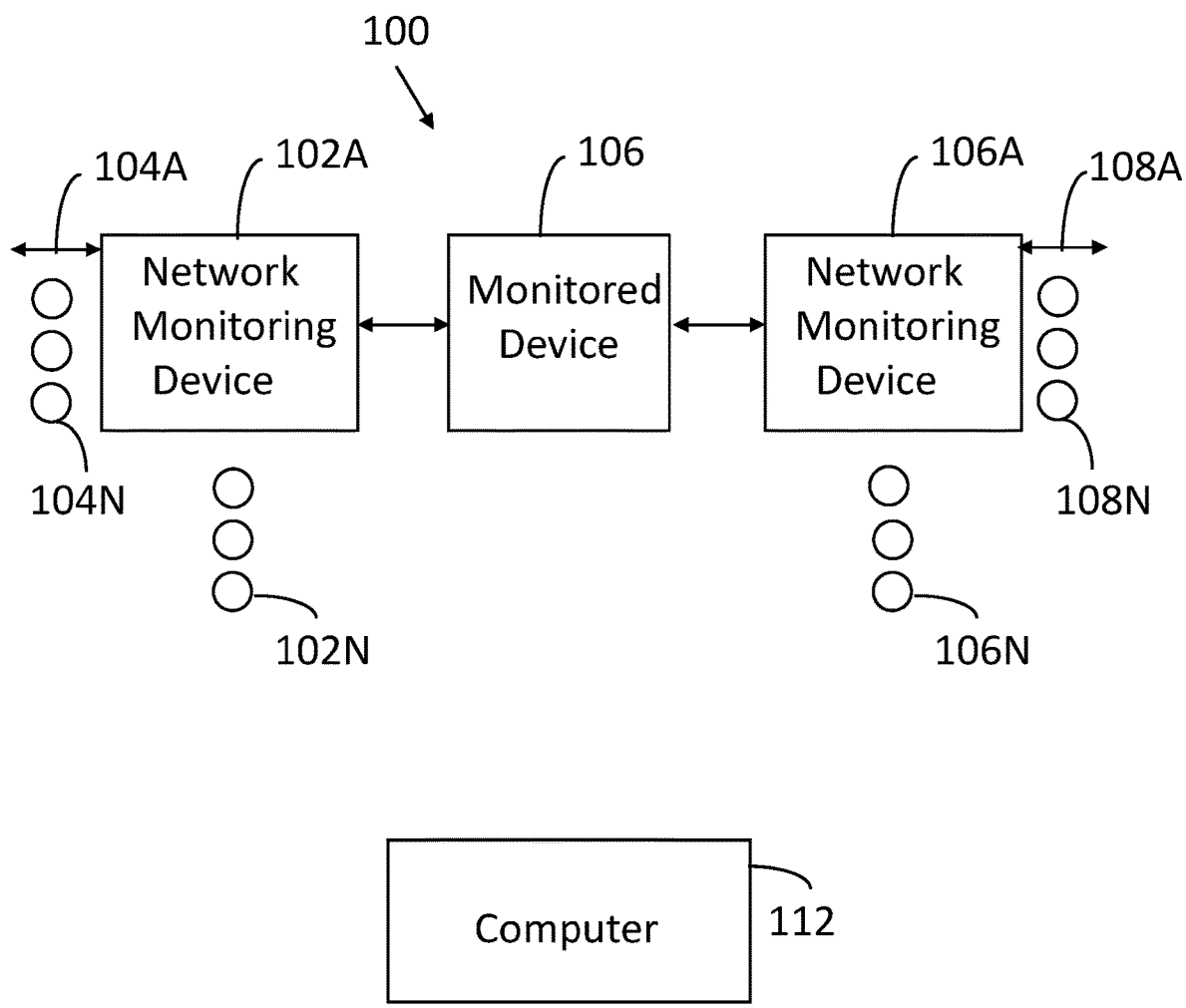
FIG. 1 illustrates a network configured in accordance with an embodiment of the invention.

FIG. 1 illustrates a system 100 for network monitoring and network analysis, in accordance with an embodiment of the invention. The system 100 includes network monitoring devices 102A-102N on the ingress side of a monitored device 106 and network monitoring devices 106A-106N on the egress side of the monitored device 106. The network traffic that is monitored and analyzed by the network monitoring devices 102 may enter the network monitoring devices 102 through interfaces 104A-104N (or interfaces 108A-108N for network monitoring devices 106A-106N). After monitoring and analysis by the network monitoring devices, the network traffic may exit the devices through the interfaces if the interfaces are bidirectional, or through other interfaces (not shown) if the interfaces are unidirectional. Each of the devices may have a large number of high-capacity interfaces, such as 32 10-Gigabit network interfaces.

U.S. Pat. No. 9,407,518 (the '518 patent), which is owned by the current applicant, discloses a network monitoring device that may be configured in accordance with embodiments of the invention. The contents of the '518 patent are incorporated herein by reference.

The network monitoring devices 102A-102N, 106A-106N use hardware counters to collect information on network traffic. The data from the counters is periodically transferred to computer 112 for evaluation under software control to generate network traffic activity data.

Thus, the disclosed invention decouples the hardware based real-time data collection performed by the network monitoring devices 102A-102N, 106A-106N from the compression, analysis, and presentation performed on computer 112. This results in a significant cost savings because specialized hardware is not required at each port. Instead, a collection of counters, commonly available on a packet switch, are used for real-time data capture. The captured data is subsequently analyzed by software running on computer 112. This cost advantage can be realized across any programmable pipeline hardware that supports the disclosed hardware real-time constructs.

Figure 2:
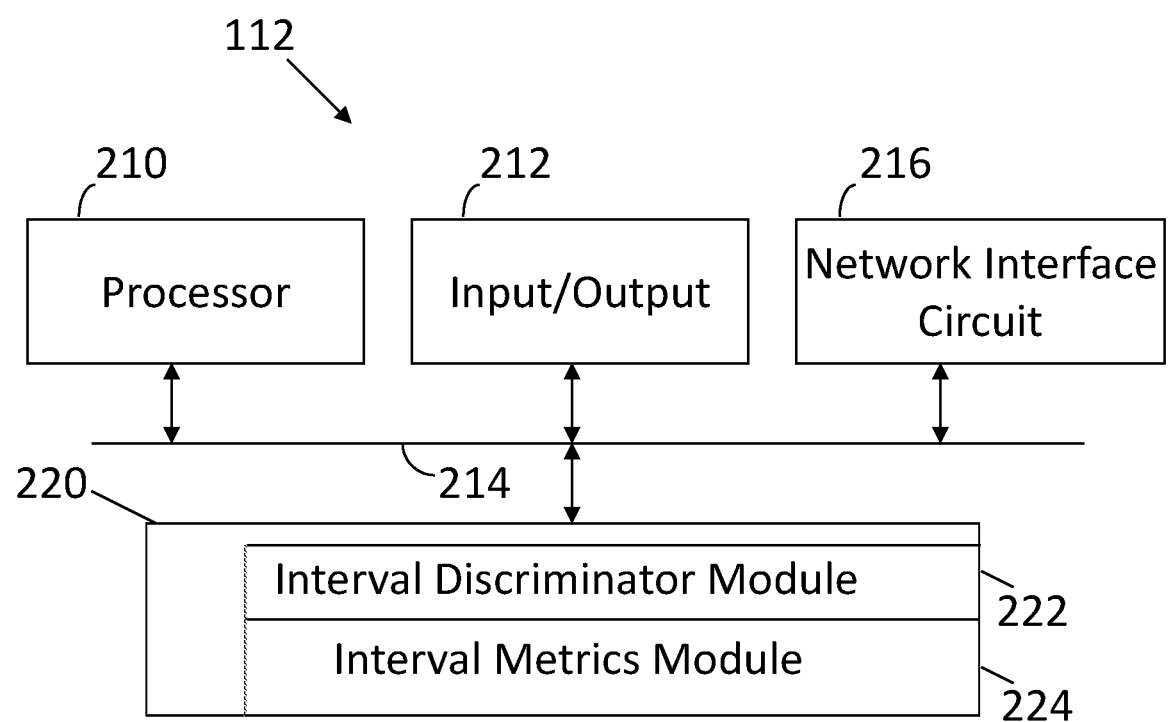
FIG. 2 illustrates a computer configured in accordance with an embodiment of the invention.

FIG. 2 illustrates a computer 112 that may be used in accordance with an embodiment of the invention. The computer 112 may include a processor 210 connected to input/output devices 212 via a bus 214. A network interface circuit 216 is also connected to the bus 214 to provide connectivity to the network hosting the devices of FIG. 1. A memory 220 is also connected to the bus 214. The memory 220 stores instructions executed by the processor 210. In one embodiment, the memory 220 stores an interval discriminator module 222.

The interval discriminator module 222 associates counter values with an actual time of day. Counters available in a network monitoring device typically do not have enough bits to express a date and time. Therefore, the interval discriminator module 222 is used to associate counter time snippets to an actual time of day.

The interval discriminator module 222 also has instructions executed by processor 210 to derive an interval discriminator configuration. As discussed below, the interval discriminator configuration is a set of rules that result in the assignment of a packet with a given counter value to a selected interval counter of a set of interval counters.

Memory 220 also stores an interval metric module 224. The interval metric module 224 includes instructions executed by processor 210 to collect values from the set of interval counters to generate network traffic activity data. In one embodiment, the network traffic data includes a maximum data rate in milliseconds, a minimum data rate in milliseconds, a data rate standard deviation, a time measurement of data rate over a pre-set threshold and a time measurement of data rate below a pre-set threshold. The network traffic activity data may also include individual flow data.

Figure 3:
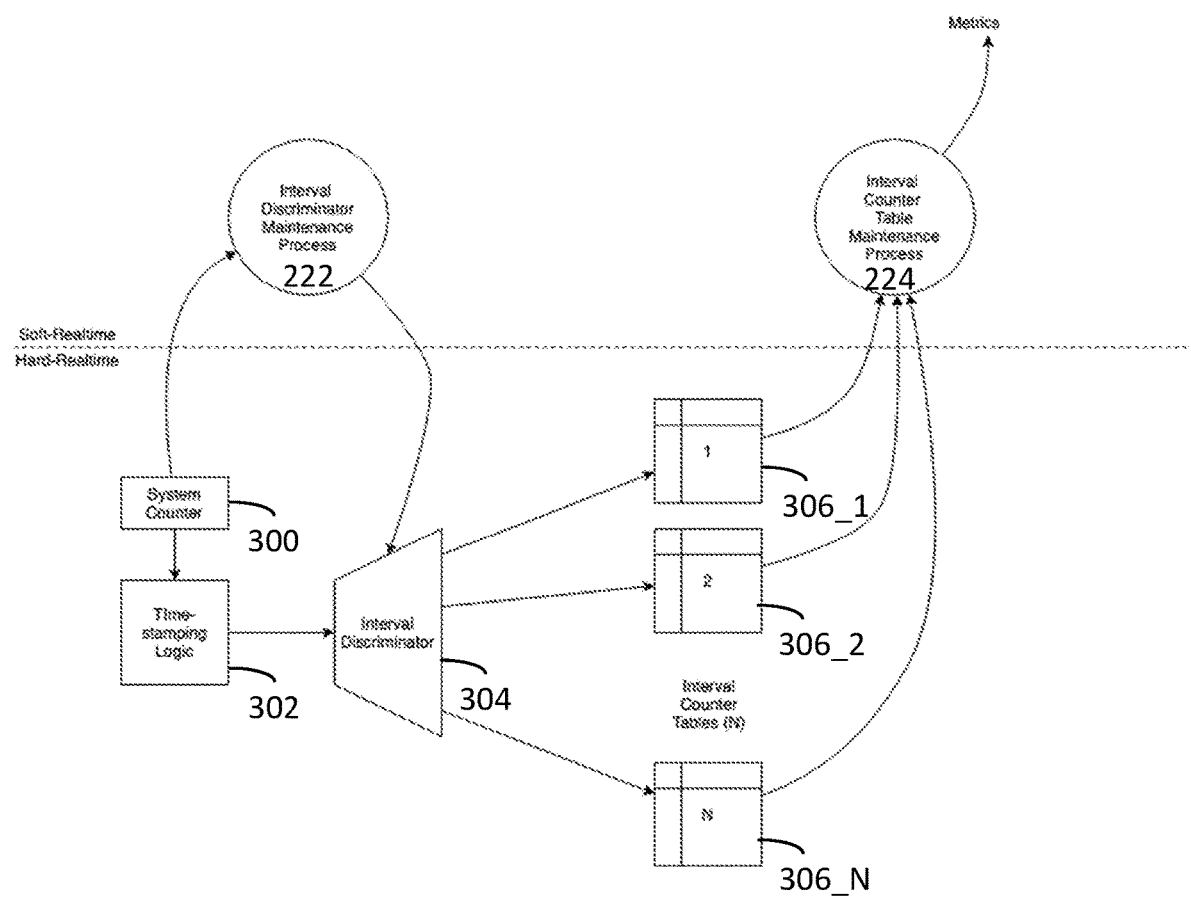
FIG. 3 illustrates hardware based and software based operations performed in accordance with an embodiment of the invention.

FIG. 3 illustrates software based processing performed by the interval discriminator module 222 and the interval metrics module 224 of computer 112. The remaining components in the figure are hardware components in the network monitoring devices 102A-102N, 106A-106N. A System Counter 300 is a hardware counter that increments automatically as time passes. This counter is synchronized to an external time source.

Timestamping Logic 302 associates the current value of the System Counter 300 with the instant of arrival of an ingress packet. The Interval Discriminator 304 considers the timestamp that was associated with the incoming packet and decides which measurement interval the packet should be assigned.

FIG. 3 also illustrates Interval Counter Tables 306_1 through 306_N. These tables count the number of packets sent to a designated interval counter. These tables could be arranged separately or combined into a large single table that also has an index to allow a specific interval's accounting to the accessed.

Interval Discriminator Maintenance Process of interval discriminator module 222 understands the relationship between the Time Reference and the actual Time of Day. In this way, it can identify which ranges of timestamp belong to which measurement interval. This information is programmed into the Interval Discriminator prior to that instant in time, such that the proper Interval Counter Table will be selected for each packet as it arrives.

Interval Counter Table Maintenance Process of interval metric module 224 evacuates the counters and prepares the Interval Counter Table for reuse. It then processes the counters for compression, analysis and presentation.

Figure 4:
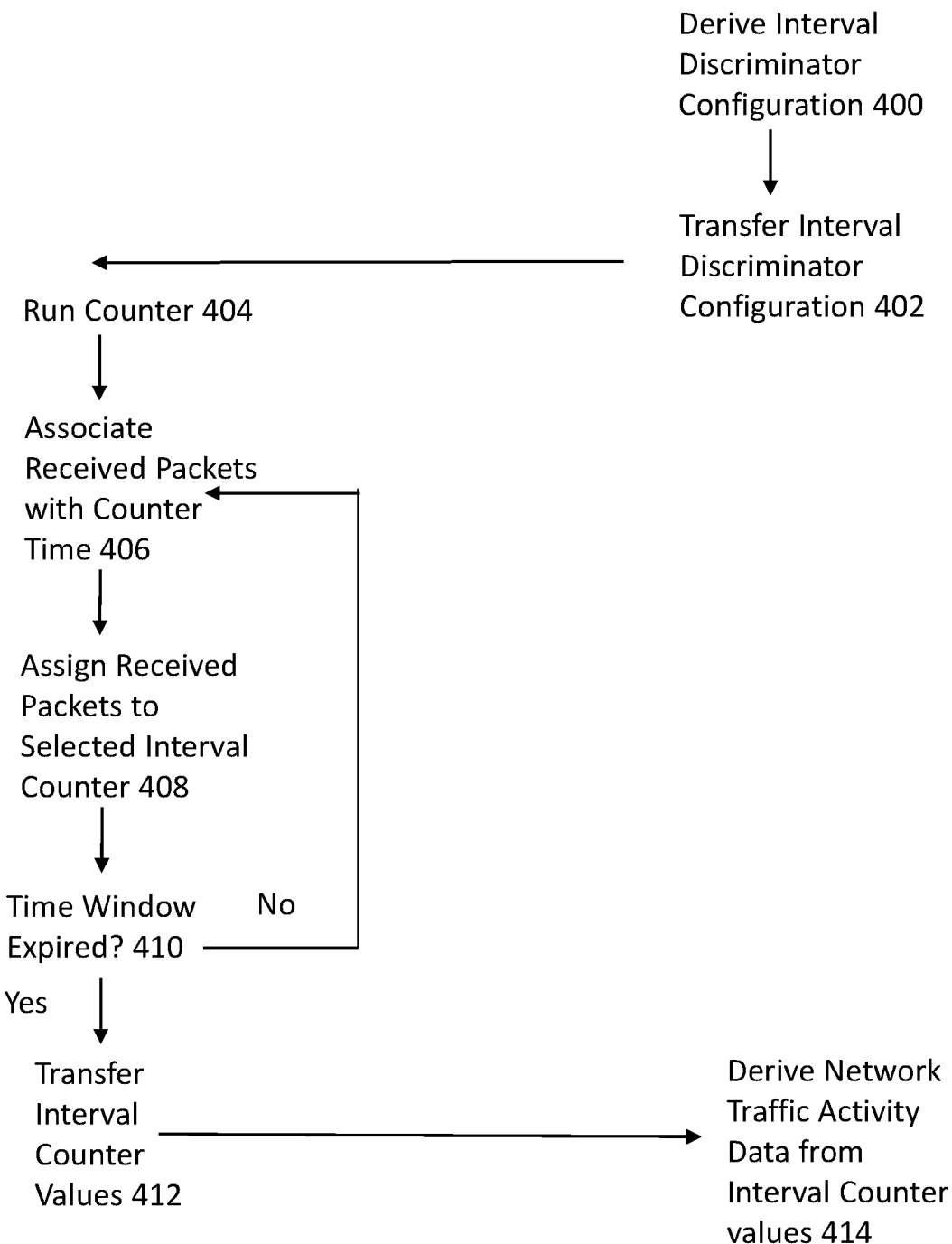
FIG. 4 illustrates processing operations associated with an embodiment of the invention.

FIG. 4 illustrates processing operations associated with the invention. The interval discriminator module 222 derives an interval discriminator configuration 400 and then transfers the interval discriminator configuration 402 to network monitoring device 102A. The System Counter 300 of the network monitoring device 102A runs 402. The Time Stamping Logic 302 associates received packets with a counter time 406. The Interval Discriminator 304 assigns received packets to a selected interval counter 408 (i.e., one of Interval Counters 306_1 through 306_N). It is then determined whether the Time Window defined by the Interval Discriminator Configuration is expired 410. If not (410—No), control returns to block 406. If so (410—Yes), the Interval Counter Values 412 are transferred to the Interval Metric Module 224 of computer 112. The Interval Metric Module 224 derives network traffic activity data from the Interval Counter values 414.

The invention is more fully appreciated with a specific example. Assume that the System Counter 300 is 32-bits wide and has nanosecond resolution. Of course, other dimensions could be used. The user desires to detect traffic bursts using 100 millisecond measurement intervals. Assume that the System Counter is synchronized such that it has value 0 at the beginning of the first measurement interval. Of course, another starting point could be used. Assume that the Interval Counter Tables 306_1 through 306_N are all available for use, and thus begin incrementing the counters in the table associated with index 0 at the beginning of the first measurement interval. If 10 Interval Counter Tables are used, this allows for 1 second to elapse before the tables would be recycled.

To prepare the Interval Discriminator 304 for the upcoming second of measurements, 10 rules (corresponding to the 10 tables) must be configured by the Interval Discriminator Module 222. Table 1 is an example of such rules.

TABLE 1

| Rule Index | Starting System Counter (nanoseconds) | Ending System Counter (nanoseconds) | Interval Counter Table Index |
|---|---|---|---|
| 0 | 0x 0000 0000 | 0x 05F5 E0FF | 0 |
| 1 | 0x 05F5 E100 | 0x 0BEB C1FF | 1 |
| 2 | 0x 0BEB C200 | 0x 11E1 A2FF | 2 |
| 3 | 0x 11E1 A300 | 0x 17D7 83FF | 3 |
| 4 | 0x 17D7 8400 | 0x 1DCD 64FF | 4 |
| 5 | 0x 1DCD 6500 | 0x 23C3 45FF | 5 |
| 6 | 0x 23C3 4600 | 0x 29B9 26FF | 6 |
| 7 | 0x 29B9 2700 | 0x 2FAF 07FF | 7 |
| 8 | 0x 2FAF 0800 | 0x 35A4 E8FF | 8 |
| 9 | 0x 35A4 E900 | 0x 3B9A C9FF | 9 |

The Interval Discriminator Module 222 passes the Table to the interval discriminator 304. Now, when the packets arrive with an associated timestamp that falls within this first second of time, the real time domain of the system has an Interval Counter Table Index assigned. This assigned index is used to direct the measurements taken on this packet to be accounted for in that table associated with that index.

As the System Counter 300 increments past the range in a specific rule (call it rule N) in the Interval Discriminator 304, the Interval Counter Table associated with that same rule is evacuated by the Interval Metrics Module 224.

Sometime after, but before 900 milliseconds beyond rule N's range has elapsed, its range will be redefined to now bracket the next 100 millisecond interval, and so on. Always keeping ahead of the System Counter 300 and wrapping as required when rolls-over occurs.

The evacuated Interval Counter Table contents are accumulated in the Interval Metrics Module 224. The Interval Metrics Module 224 quantifies traffic bursts in terms of when they occurred, how long they persisted, their magnitude, and other details describing the origin of the burst inducing communication.

In one embodiment, the network traffic data includes a maximum data rate per interval (e.g., per 100 milliseconds), a minimum data rate per interval, a data rate standard deviation per interval, a time measurement of data rate over a pre-set threshold per interval and a time measurement of data rate below a pre-set threshold per interval. The network traffic activity data may also include individual flow data.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
a packet switch for routing network traffic, the packet switch including a system counter to increment a counter time in predetermined time segments to form system counter time domain data, time stamping logic to associate a received packet with the counter time, and an interval discriminator with a set of rules to assign a received packet to a selected interval counter of a set of interval counters based upon the counter time, the interval discriminator considers a timestamp associated with each incoming packet and decides which measurement interval the packet should be assigned, where each interval counter in the set of interval counters has a unique starting system counter value and a unique ending system counter value and stores counter time snippets insufficient to express a date and time; and
a computer connected to the packet switch, the computer including a memory with instructions executed by a processor to:
associate the counter time with a time of day and thereby link the system counter time domain data to the time of day, and
collect values from the set of interval counters to generate network traffic activity data.

2. The system of claim 1 wherein the network traffic activity data includes a maximum data rate.

3. The system of claim 1 wherein the network traffic activity data includes a minimum data rate.

4. The system of claim 1 wherein the network traffic activity data includes a data rate standard deviation.

5. The system of claim 1 wherein the network traffic activity data includes a time measurement of data rate over a pre-set threshold.

6. The system of claim 1 wherein the network traffic activity data includes a time measurement of data rate below a pre-set threshold.

7. The system of claim 1 wherein the network traffic activity data includes individual flow data.

8. The system of claim 1 wherein the computer includes instructions executed by the processor to derive an interval discriminator configuration.

* * * * *